United States Patent
Hori et al.

(10) Patent No.: US 7,877,187 B2
(45) Date of Patent: Jan. 25, 2011

(54) DRIVING SUPPORT METHOD AND DEVICE

(75) Inventors: Koji Hori, Okazaki (JP); Hidefumi Okabe, Okazaki (JP); Yoshitaka Masuda, Tokyo (JP)

(73) Assignee: AISIN AW Co., Ltd. (JP)

( * ) Notice: Subject to any disclaimer, the term of this patent is extended or adjusted under 35 U.S.C. 154(b) by 1068 days.

(21) Appl. No.: 11/342,579

(22) Filed: Jan. 31, 2006

(65) Prior Publication Data

US 2006/0235597 A1    Oct. 19, 2006

(30) Foreign Application Priority Data

Mar. 3, 2005    (JP) .............................. 2005-058989

(51) Int. Cl.
*B60T 7/12*    (2006.01)
(52) U.S. Cl. .......................... 701/96; 340/436; 340/903
(58) Field of Classification Search .................. 701/23, 701/25, 26, 28, 29, 96, 117
See application file for complete search history.

(56) References Cited

U.S. PATENT DOCUMENTS

| | | | | |
|---|---|---|---|---|
| 3,796,871 | A | * | 3/1974 | Helmcke et al. ........ 246/167 R |
| 4,600,913 | A | * | 7/1986 | Caine ........................... 340/435 |
| 6,115,652 | A | * | 9/2000 | Sato et al. ..................... 701/28 |
| 6,808,058 | B2 | | 10/2004 | Shihara |
| 7,021,857 | B2 | * | 4/2006 | Van Der Poel ................ 404/9 |
| 7,561,180 | B2 | | 7/2009 | Koike |
| 2004/0047685 | A1 | * | 3/2004 | Van Der Poel ................ 404/9 |
| 2004/0105579 | A1 | * | 6/2004 | Ishii et al. .................... 382/154 |
| 2005/0015203 | A1 | * | 1/2005 | Nishira ....................... 701/301 |
| 2005/0117364 | A1 | * | 6/2005 | Rennick et al. ............. 362/540 |

FOREIGN PATENT DOCUMENTS

| | | |
|---|---|---|
| DE | 197 25 656 | 1/1998 |
| EP | 1 346 877 | 9/2003 |
| EP | 1 470 957 | 10/2004 |
| JP | 10-105884 | 4/1998 |
| JP | 2002307973 | 10/2002 |
| JP | 2003285685 | 7/2003 |

* cited by examiner

*Primary Examiner*—Khoi Tran
*Assistant Examiner*—Rodney King
(74) *Attorney, Agent, or Firm*—Bacon & Thomas, PLLC (57) ABSTRACT

A navigation device provides support for a driver of a vehicle in merging from one road onto another road (main road). The navigation device receives traffic information including at least positions and speeds of other vehicles traveling the main road. The navigation device then detects at least positions of inter-vehicle spaces between those other vehicles, using the traffic information, and determines which one of the detected inter-vehicle spaces is most suitable for the driver's vehicle to enter for merging. A beam radiating unit provided in the driver's vehicle is used to form a moving first entry point mark on the road surface to indicate the inter-vehicle space the driver's vehicle is going to enter upon merging.

16 Claims, 6 Drawing Sheets

DRIVING SUPPORT METHOD AND DEVICE

The disclosure of Japanese Patent Application No. 2005-058989 filed on Mar. 3, 2005 including the specification, drawings and abstract is incorporated herein by reference in its entirety.

BACKGROUND OF THE INVENTION

1. Field of the Invention

The present invention relates to a driving support method and a driving support device.

2. Description of the Related Art

In recent years, navigation systems have been proposed that utilize Intelligent Transport Systems (ITS) to address problems like traffic accidents and congestion. One such system has been proposed that provides driving support in order to reduce accidents and promote smooth traffic flow. In this system, roadside transmitters transmit traffic information about congestion, traffic accidents and the like, and this information is then used to search for alternative routes to the target destination. As another example, Japanese Patent Application Publication No. JP-A-10-105884 suggests a system for use at locations where roads merge onto a high speed road or the like. This latter system transmits information about acceleration and deceleration to the vehicles running on a merging road (an acceleration lane) and the vehicles running on a main road so that the distance between vehicles on the main road can be adjusted when the roads merge.

However, with the above merge guidance system, the drivers of the vehicles in the main road are not able to accurately understand the position at which the vehicles in the merging road will merge into the main road. In addition, it is difficult for the system to provide support when merging is complicated. For example, when a vehicle has entered into the acceleration lane it is not always the case that there is a space present between the vehicles in the main road that is suitable for the driver's vehicle to merge into and that is close to the driver's vehicle, even if speed is adjusted.

SUMMARY OF THE INVENTION

The present invention has been devised in light of the above problems, and it is an object thereof to provide a driving support device and a driving support method that facilitate smooth merging of a vehicle onto another road.

According to a first aspect of the present invention, when a vehicle is running along a merging road, inter-vehicle spaces between other vehicles running along a main road are detected based on traffic information by a driving support device mounted in the driver's vehicle. Then, an inter-vehicle space which is suitable for entry upon merging of the driver's vehicle is determined by the driving support device. Further, notification is provided to the drivers of the other vehicles about the inter-vehicle space into which the driver's vehicle is going to merge, using an image forming unit provided in the driver's vehicle. With this configuration, areas that do not enter into the driver's field of vision are detected and the point at which it is easiest to merge is selected from among the spaces. Accordingly, instructions for a suitable merging point can be provided to the driver. In addition, drivers of the other vehicles on the main road are notified of the inter-vehicle space into which the driver's vehicle is going to merge, whereby it is possible to reduce the likelihood of an accident with another vehicle.

According to a second aspect of the present invention, the driving support device includes a driver's vehicle information obtaining unit, a traffic information obtaining unit that obtains traffic information, and a calculation unit that calculates respective positions and lengths of intervehicle spaces between other vehicles, based on the traffic information. In addition, the driving support device also includes a space determining unit that determines which intervehicle space, among the calculated inter-vehicle spaces, is suitable for the driver's vehicle to merge into; and an imaging control unit that notifies drivers of the other vehicles of the determined intervehicle space. With this configuration, the driving support device detects areas that do not enter into the driver's field of vision, and calculates to identify the inter-vehicle space into which it is easiest to merge from among the spaces. Accordingly, instructions about a suitable merging point can be provided to the driver. In addition, the drivers of the other vehicles on the main road are notified of the intervehicle space into which the vehicle is going to merge, whereby it is possible to reduce the likelihood that an accident will occur with another vehicle.

According to a third aspect of the present invention, the imaging control unit operates a beam emitting unit provided in the driver's vehicle to form an image (mark) on the road surface in the inter-vehicle space into which the driver's vehicle is to merge. As a result, the drivers of the other vehicles are accurately informed of the inter-vehicle space to be entered by the driver's vehicle upon merging.

According to a fourth aspect of the present invention, the imaging control unit forms different image marks on the road surface in accordance with the length of the inter-vehicle space into which the driver's vehicle is to merge. Thus, even if the length of the inter-vehicle space into which the driver's vehicle is to merge is small, smooth merging is enabled.

According to a fifth aspect of the present invention, the imaging control device operates a display unit provided on the driver's vehicle, and displays on the display unit a symbol that indicates the inter-vehicle space into which the driver's vehicle is to merge. As a result, the drivers of the other vehicles are accurately informed about the inter-vehicle space that the driver's vehicle is to enter upon merging.

According to a sixth aspect of the present invention, the driving support device further includes a computation unit and an output control unit. The computation unit calculates a recommended speed, timing, or the like for the driver's vehicle entry into the determined inter-vehicle space upon merging. The output control unit outputs the recommended speed or the timing using a speaker and/or a display. With this configuration, the driver is provided with instructions for the recommended speed and timing for smoothly merging, and thus the driver's driving burden is reduced.

According to a seventh aspect of the present invention, the output control unit displays the position of the inter-vehicle space which the driver's vehicle is to enter upon merging.

As a result, the driver knows in advance of approach to the inter-vehicle space and thus is able to merge more easily.

DETAILED DESCRIPTION OF THE PREFERRED EMBODIMENTS

First Embodiment

Figure 1:
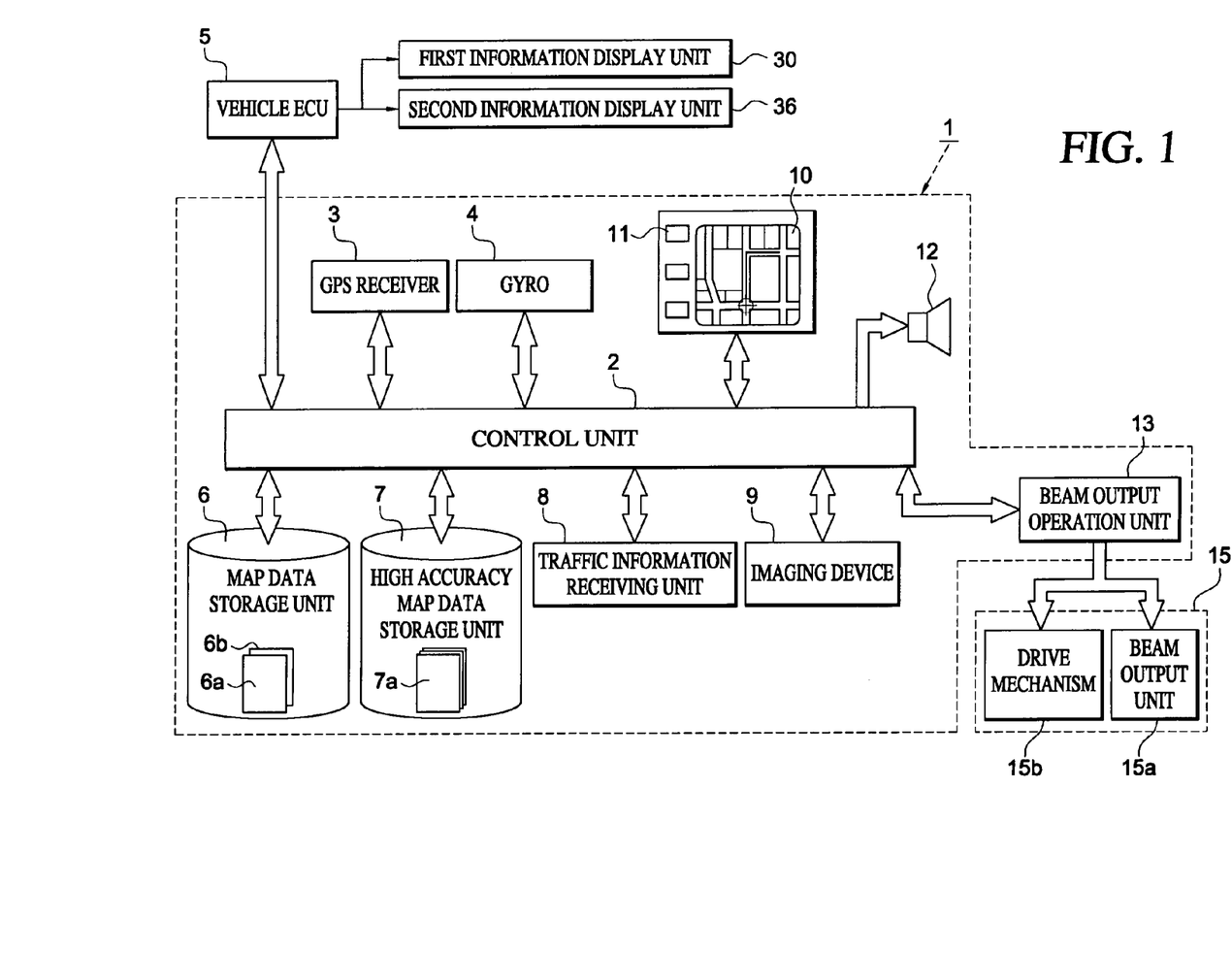
FIG. 1 is a block diagram showing the configuration of a navigation device according to embodiment of the present invention.

Hereinafter, a first embodiment for carrying out the present invention will be explained with reference to FIGS. 1 to 8. FIG. 1 is a block diagram showing the configuration of a navigation device 1 that functions as a driving support device by providing guidance for a vehicle in merging onto a main road.

Referring to FIG. 1, the navigation device 1 includes a control unit 2 which has a CPU, a ROM, a RAM, etc. (not shown), and executes various programs such as route search and guidance programs, absolute position calculation programs, and merge guidance programs, stored in the ROM. The control unit 2 includes a driver's vehicle information obtaining unit, a traffic information obtaining unit, a calculation unit, a space determination unit, an imaging control unit, a computation unit and an output control unit.

The navigation device 1 is provided with a GPS receiver 3 that functions as the driver's vehicle information obtaining unit and receives radio signals from GPS satellites. The control unit 2 uses the data received by the GPS receiver 3 and by execution of the absolute position calculation program to calculate position data for the longitude, latitude and altitude of the driver's vehicle.

The navigation device 1 is also provided with a gyro 4. The control unit 2 obtains the relative position of the driver's vehicle from the gyro 4. Moreover, the control unit 2 is connected to a vehicle electronic control unit (hereinafter "vehicle ECU") 5 such that various types of data can be transmitted therebetween. The speed of the driver's vehicle is obtained from the vehicle ECU 5. In addition, the control unit 2 uses the obtained relative position, the vehicle speed, and the position data from the GPS receiver 3 to calculate the driver's vehicle position.

The navigation device 1 includes a map data storage unit 6 and a high accuracy map data storage unit 7. The map data storage unit 6 stores route data 6a and image data 6b that constitutes the map data The route data 6a includes node data, link data, and the like. When the control unit 2 executes a route guidance routine to guide the driver to the target destination, the control unit 2 searches for the route using the route data 6a and the route search program. The image data 6b is data for display of maps with a range of scales from large to small.

The high accuracy map data storage unit 7 stores high accuracy map data 7a. The high accuracy map data 7a includes data for all the roads included in the route data 6a, and sign-marking position data including the positions of road signs located close to the roads and various indicator markings on the roads. The sign-marking position data includes, for example, the positions of white lines that divide road lanes, the positions of pedestrian crossing signs, and the positions of guidance signs showing entrances to high speed roads, e.g. expressways, etc.

The navigation device 1 includes a traffic information receiving unit 8. The traffic information receiving unit 8 receives traffic information from a transmitter 17 shown in FIG. 2. The transmitter 17 is positioned close to a merging road 102 that merges with a main road 100 that is a high speed road. The transmitter 17 receives detection data from, for example, a measurement detector 18 that is positioned above the main road 100. The transmitter 17 transmits this detected data to a driver's vehicle 105 that is traveling on the merging road 102.

Figure 2:
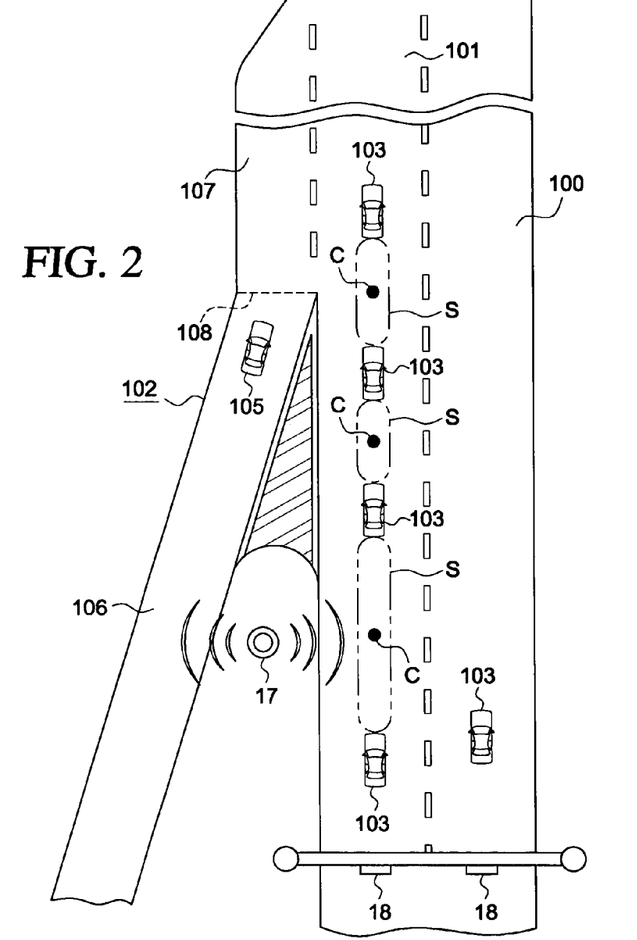
FIG. 2 is a diagram illustrating the positions of vehicles in a main lane and a merging lane.

More specifically, the measurement detector 18 detects at the least the absolute position, the speed, and the acceleration or deceleration of other vehicles 103 traveling in a lane 101 to be entered upon merging. Note that this lane 101 to be entered is the one lane, among the various lanes of the main road 100, that the driver's vehicle 105 in the merging road 102 is able to enter. Then, the data detected for all of the detected other vehicles 103 is transmitted to the transmitter 17.

Figure 3:
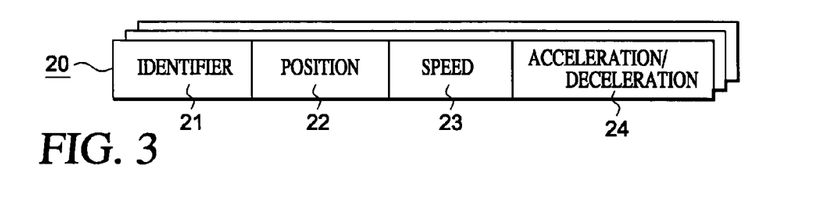
FIG. 3 is a diagram showing the data structure of traffic information utilized by the embodiment of FIG. 1.

The transmitter 17 assigns a different identifier to each set of the detected data received within a predetermined time period, for example two seconds, and then transmits the respective sets of traffic information 20 as a data bundle. As shown in FIG. 3, each set of traffic information 20 includes, at the least, the identifier 21 assigned to each of the other vehicles 103 (detected datum), position data 22 for each of the other vehicles 103, speed data 23, and acceleration-deceleration data 24. Note that the transmitter 17 periodically transmits the traffic information 20 to the driver's vehicle 105. As a result, when the driver's vehicle 105 equipped with the navigation device 1 reaches the vicinity of the transmitter 17, the traffic information receiving unit 8 periodically receives the traffic information 20. Accordingly, the navigation device 1 is able to constantly obtain updated data indicating the state of the traffic in the lane 101 to be entered.

The navigation device 1 also includes imaging devices 9. The imaging devices 9 each include an image taking mechanism such as CCD image elements, lenses, etc., that are provided at the front and rear ends of the driver's vehicle 105. The imaging devices 9 image the area around and the road surface near to the driver's vehicle 105, etc. The control unit 2 receives the image data produced by the imaging devices 9, and analyses it using a known processing method. Road markings on the road and road signs, etc. are then detected, and the distances from the driver's vehicle 105 to the road markings etc. are calculated.

Moreover, the navigation device 1 is provided with a display 10 and an operation switch 11. The display 10 is a touch panel and outputs the image data 6b when commanded to do so by the control unit 2, and displays a mark denoting the driver's vehicle on a map screen along with road markings, etc. The navigation device 1 also includes a speaker 12 which outputs various types of spoken guidance information and guidance sounds based on signals transmitted from the control unit 2.

The control unit 2 transmits various signals via the vehicle ECU 5 to first and second information display units 30, 36 provided in an instrument panel, not shown, of the driver's vehicle 105. The first and second information display units 30, 36 are liquid crystal displays or similar display devices, and display images when they receive the signals from the control unit 2.

The navigation device 1 includes a beam control unit 13. The beam control unit 13 controls operation of a beam radiating unit 15 that is provided in the driver's vehicle 105 and that functions as an image forming means. Beam radiating units 15 are provided at the left and right sides of the driver's vehicle 105 and each includes a beam output unit 15a that is a semiconductor laser, or the like, and an operation mechanism 15b that adjusts the direction of the beam. The operation mechanism 15b is a mirror or the like. The beam output operation unit 13 controls the operation mechanism 15b to adjust the direction of the beam based upon position and orientation information received from the control unit 2. Further, the beam control unit 13 operates the beam output unit 15*a* to output a visible laser beam toward the road surface. The laser beam forms a mark with an oval shape, a triangular shape, or the like, on the road surface.

Figure 4:
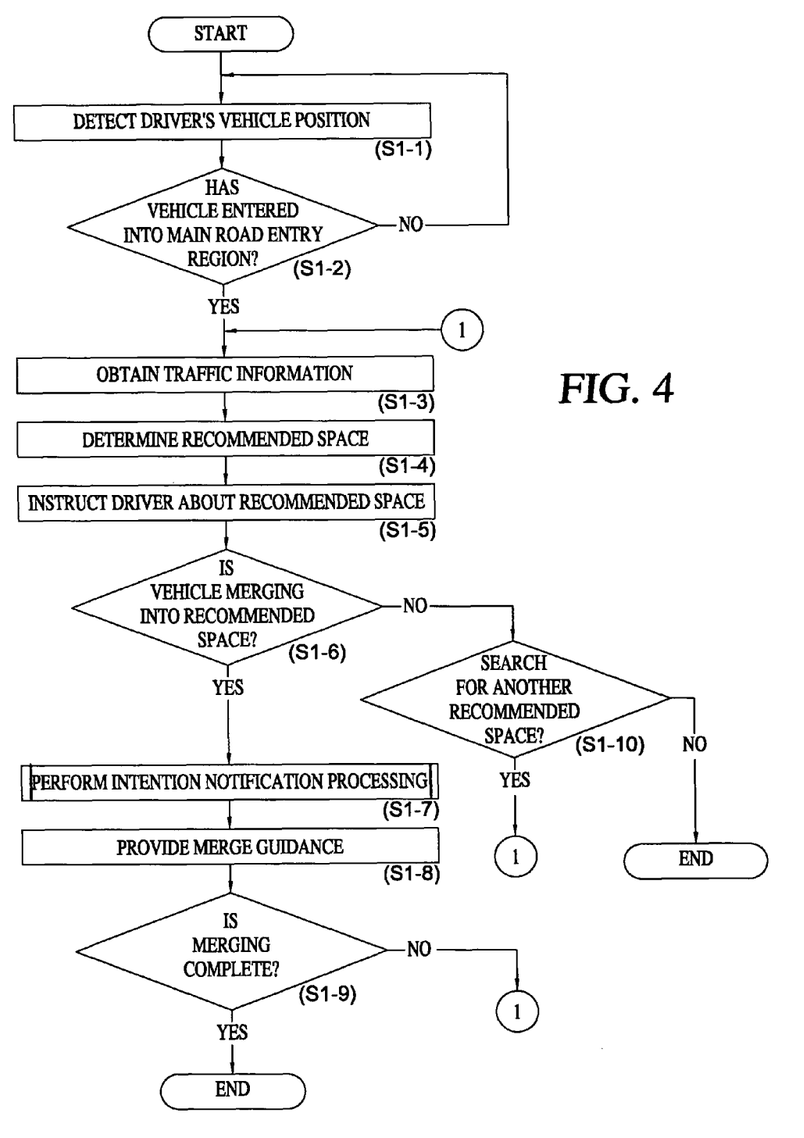
FIG. 4 is a flow chart of a control routine executed by the embodiment of FIG. 1.

Next, guidance processing by the control unit 2 for the driver's vehicle 105 will be explained with reference to FIG. 4. When this guidance processing is being performed, the navigation device 1 may execute a route-search routine to determine an optimum route to the target destination, and a guidance routine to display the position of the driver's vehicle on a map of the surrounding area.

First, the control unit 2 of the navigation device 1 detects the driver's vehicle position that constitutes the driver' vehicle information (step S1-1). At this time, the control unit 2 calculates the driver's vehicle position based on the position data from the GPS receiver 3 and the orientation and the vehicle speed obtained from the gyro 4 and the vehicle ECU 5. Then, the control unit 2 receives the image data from the imaging devices 9 and calculates the position of road markings and signs. The calculated positions of the road markings and signs are then compared with those of the high accuracy map data 7*a*, thus allowing the absolute position of the driver's vehicle 105 to be accurately determined. Note that, the navigation device 1 is mounted in the driver's vehicle 105 that is to merge onto the main road 100.

The control unit 2 determines whether the driver's vehicle 105 has entered a main road entry region 106 based on the calculated driver's vehicle position and the route data 6*a* of the map data storage unit 6 (step S1-2). The main road entry region 106 is a region that extends, for example, from a toll gate at the entrance to the high speed road, along the entry ramp, and as far as an entry boundary line 108 of an acceleration region 107 that runs parallel with the lane 101 to be entered (refer to FIG. 2). If it is determined that the driver's vehicle 105 has not entered the main road entry region 106 (NO in step S1-2), the driver's vehicle position detection (step S1-1) and the determination as to whether the driver's vehicle has entered the main road entry region 106 (step S1-2) are repeated.

If the driver's vehicle 105 is determined to have entered the main road entry region 106 (YES in step S1-2), the control unit 2 obtains the traffic information 20 from the traffic information receiving unit 8 (step S1-3).

Next, the control unit 2 determines a recommended space that is suitable for merging based on the obtained traffic information 20 and the driver's vehicle information (step S1-4). More specifically, the control unit 2 (i) estimates a maximum speed and a minimum speed for the driver's vehicle 105 when it reaches the entry boundary line 108, based on the position of the driver's vehicle and the driver's vehicle speed that constitute the driver's vehicle information, and (ii) calculates an estimated boundary reaching time T1 at the maximum speed and an estimated boundary reaching time T2 at the minimum speed. The estimated boundary reaching times T1 and T2 are then set as upper and lower threshold values, and an estimated boundary reaching time range is calculated.

The control unit 2 then uses the obtained traffic information 20 as a basis for calculating the position of each inter-vehicle spacing S, i.e. the distances between other vehicles 103 in the lane of the main road into which vehicle 105 is to merge, and the speed of movement of each inter-vehicle space (spacing) S. The control unit 2 also calculates a center point C of each inter-vehicle space S (refer to FIG. 2).

The control unit 2 uses the speed of movement and the center points C as a basis for estimating the position that the respective center points C of the inter-vehicle spaces S will reach within the estimated boundary line reaching time range. Then, any inter-vehicle space S for which the distance from the center point C to the entry boundary line 108 is within a determined range is detected (and identified). At this time, for example, if the speed of movement of a given inter-vehicle spacing S is a high speed of around 80 km, for example, it is determined whether the center point C is within a range of distance up to 120 meters behind the entry boundary line 108. Alternatively, if the speed of movement of a given inter-vehicle space S is a low speed of 30 to 50 km, for example, it is determined whether the center point C is within a distance range from 10 meters in front to 50 meters behind the entry boundary line 108.

Next, the control unit 2 calculates the length of each inter-vehicle space S based on the speed data 23 contained in each set of traffic information 20, etc. Then, the position of the center point C of the inter-vehicle space S and the length of the inter-vehicle space S are used as a basis for selecting, from among all of the inter-vehicle spaces S, the one inter-vehicle space S that will be easiest for the driver's vehicle 105 to enter for merging. This one inter-vehicle space S is then set as the recommended space.

Figure 5:
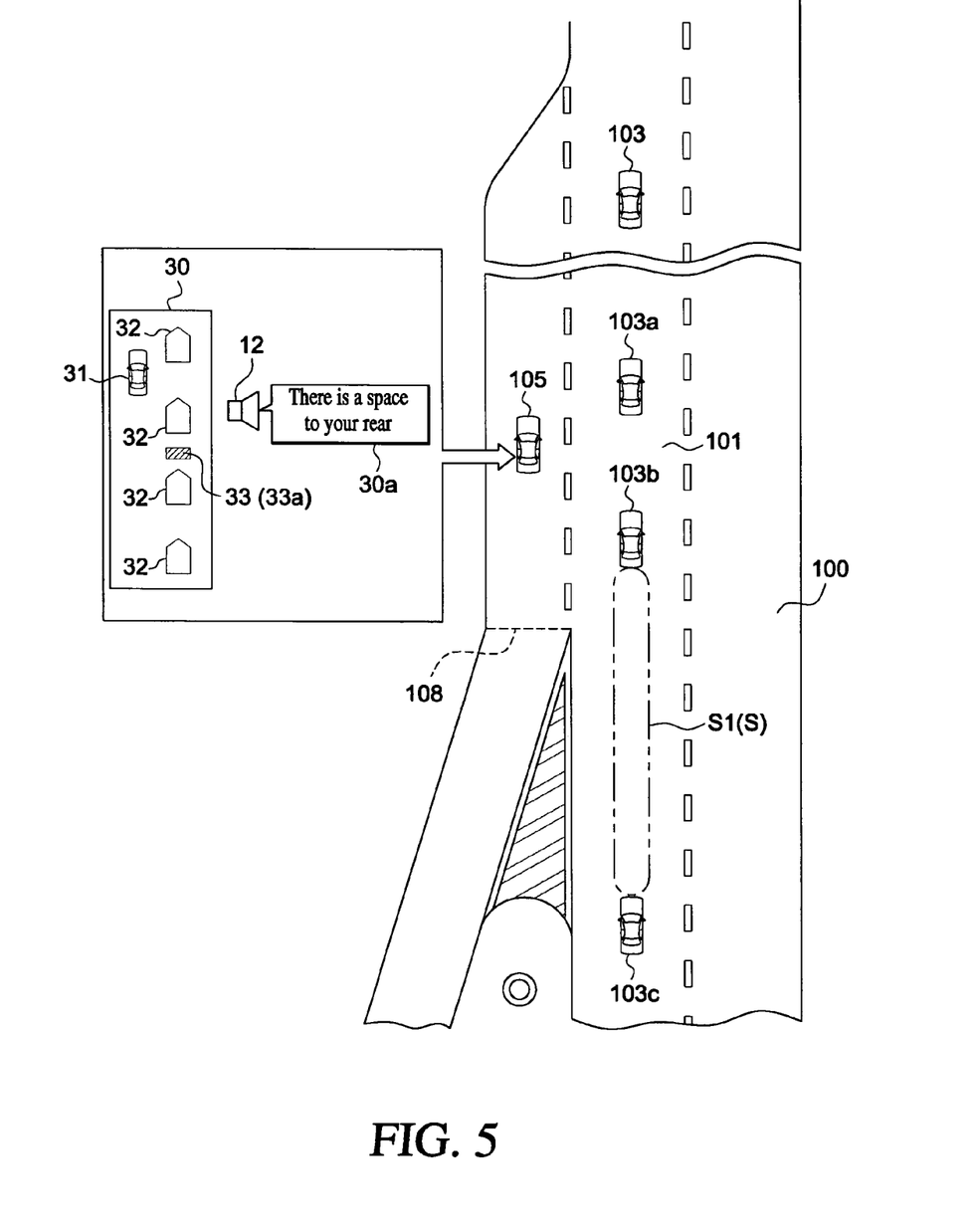
FIG. 5 is a diagram illustrating positions of vehicles and the guidance information output by the navigation device.

Once the recommended space has been set, the control unit 2 provides instructions for entering the recommended space to the driver of vehicle 105 (step S1-5). The control unit 2 displays the position of the recommended space on the first information display unit 30 as shown in FIG. 5. In this example, the control unit 2 displays on the first information display unit 30, via the vehicle ECU 5, (i) a driver's vehicle display symbol 31, (ii) other vehicle display symbols 32 for four other vehicles in a row, and (iii) spacing display symbols 33 for the spaces between the adjacent display symbols 32 for the other vehicles. The space display symbols 33, may be rectangular shaped symbols 33*a* or triangular shaped symbols 33*b* (refer to FIG. 7). Further, the driver's vehicle display symbol 31 may be displayed in the right side row of the display symbols 32 for other vehicles and the space display symbols 33.

For example, as can be seen from FIG. 5, when there is another vehicle 103*a* to the side of the driver's vehicle 105, another vehicle 103*b* behind the other vehicle 103*a*, and a recommended space S1 behind the other vehicle 103*b*, the control unit 2 displays a flashing space display symbol 33 behind the other vehicle display symbol 32, second from the top of the display of the first information display unit 30. In addition, when the other vehicle 103*b* reaches the side of the driver's vehicle 105, the control unit displays the space display symbol 33 behind the other vehicle display symbol 32 that is at the top of the display of the first information display unit 30. In addition, the control unit 2 outputs a guidance voice 30*a* that announces "Do you want to merge into the recommended space?", or the like, using the speaker 12.

The control unit 2 then determines whether the driver's vehicle 105 is going to merge into the recommended space S1 (step S1-6). More specifically, the control unit 2 determines that the driver's vehicle 105 is going to merge into the recommended space S1 if, in response to the recommended space instruction of step S1-5, the driver operates the switch 11 etc. and performs operations in order to merge into the instructed recommended space S1 (YES in step S1-6). Then, the control unit 2 executes merging intention notification processing to alert the drivers of the other vehicles 103 in the lane 101 to be entered (step S1-7).

In the merging intention notification processing, the length and speed of movement of the recommended space S1 are used to determine whether the length of the recommended space S1 is sufficient to accommodate the driver's vehicle 105 for merging. For example, if the speed of movement of the recommended space S1 is a speed of 80 km, and the length of the recommended space S1 is equal to or more than a length that allows merging, given the speed of movement of the recommended space S1 (for example, equal to or more than 30 meters), the control unit 2 determines that the length is sufficient to allow merging of the driver's vehicle 105. Furthermore, if the speed of movement S1 of the recommended space S1 is 60 km, and the length of the recommended space S1 is a length that allows merging given the speed of movement of the recommended space S1 (for example, equal to or more than 20 meters), the control unit 2 also determines that that the length is sufficient to allow merging of the driver's vehicle 105. Then, the control unit 2 calculates the distance from position of the driver's vehicle to the recommended space S1 and the relative orientations thereof. Signals for the calculated values and a signal that specifies the image shape to be formed are transmitted to the beam control unit 13. When it has received these signals, the beam control unit 13 operates the beam radiating unit 15 and the operation mechanism 15b so as to align the position on the road surface that will be irradiated with the recommend space S1. Then, the control unit 2 transmits output commands to the beam output unit 15a, which outputs the laser beam.

As a result, the laser beam irradiated from the beam radiating unit 15 forms an oblong shaped first entry point mark 109 in the recommended space S1 to the rear-right side of the driver's vehicle 105. This first entry point mark 109 is about the same size as the driver's vehicle 105. The driver of the other vehicle 103c to the rear of the recommended space S1 (refer to FIG. 5) sees the first entry point mark 109 formed on the road surface and thus obtains advance knowledge of both (i) the fact that the driver's vehicle 105 is going to merge, and (ii) the position where the vehicle is going to merge. In addition, since the size of the first entry point mark 109 is about the same size as the driver's vehicle 105, the driver of the other vehicle 103c is able to accurately understand the area (spacing) that will be necessary for merging of the vehicle 105.

On the other hand, when the length of the recommended space S1 is not sufficient to allow merging, the control unit 2 similarly calculates the relative distance between the recommended space S1 and the driver's vehicle position and the relative orientations thereof. Data for these calculated values and a signal specifying the image shape to be formed are transmitted to the beam control unit 13. The beam control unit 13 then operates the beam output unit 15a and the operation mechanism 15b to output a laser beam toward the recommended space S1.

Figure 7:
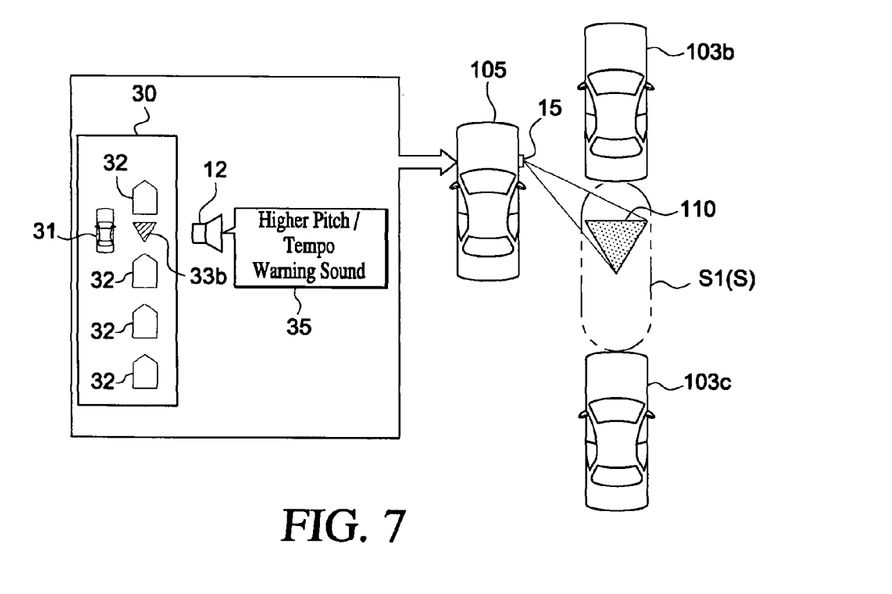
FIG. 7 is a diagram illustrating the marking of the merging position and the output of guidance information by the navigation device.

As a result, as can be seen from FIG. 7, the beam radiating unit 15 forms a triangular second entry point mark 110 in the recommended space S1 to the rear-right side of the driver's vehicle 105. Accordingly, the driver of the other vehicle 103c (refer to FIG. 7) that is to the rear of the recommended space S1, obtains advance knowledge of the fact that the vehicle 105 is going to merge, from the triangular second entry point mark 110 formed on the road surface. In addition, since the image mark formed on the road surface is the triangular second entry point mark 110, the driver of the other vehicle 103c is notified that unless he/she slows down it will not be possible for the driver's vehicle 105 to merge.

When the merging intention notification processing is completed, the control unit 2 provides merger guidance to the driver of the vehicle 105 (step S1-8). First, the control unit 2 calculates a recommended speed for merging into the recommended space S1 based on the traffic information 20 and the driver's vehicle information. At this time, the control unit 2 calculates the recommended speed based upon the present position of the driver's vehicle 105 and the position and speed of movement of the recommended space S1.

Figure 8:
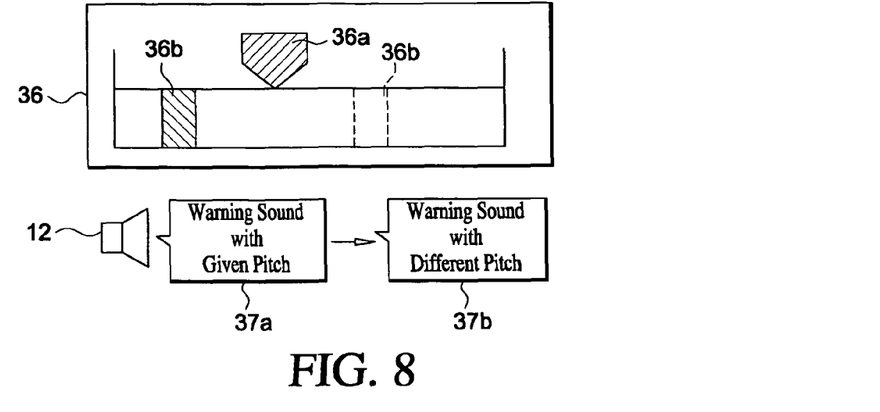
FIG. 8 is a diagram of an information display unit.

Once the recommended speed has been calculated, the control unit 2 uses the second information display unit 36 provided in the instrument panel of the driver's vehicle 105 to display the recommended speed. As shown in FIG. 8, on the second information display unit 36 is displayed a recommended vehicle speed display symbol 36a that indicates the recommended speed and current vehicle speed display symbol 36b that indicates the current vehicle speed. The control unit 2 determines the display position of the recommended vehicle speed display symbol 36a based on the recommended vehicle speed. Further, the control unit 2 determines the display position of the current vehicle speed display symbol 36b based on the current vehicle speed.

If the current vehicle speed is lower than the recommended vehicle speed, when the difference between the current vehicle speed and the recommended vehicle speed becomes equal to or more than a predetermined value, the control unit 2 outputs a warning sound 37a for guidance using the speaker 12. Further, when the current vehicle speed is greater than the recommended vehicle speed, and when the difference between the current vehicle speed and the recommended vehicle speed becomes equal to or greater than a predetermined value, the current vehicle speed display symbol 36b is moved to the right side of the recommended vehicle speed display symbol 36a, and a warning sound 37b is generated by the speaker 12. The warning sound 37b generated at this time has a frequency or tempo that is different to that of the warning sound 37a generated when the current vehicle speed is slower than the recommended vehicle speed. Accordingly, the driver can tell from the difference in frequency or tempo that it is necessary to reduce or increase the vehicle speed.

Figure 6:
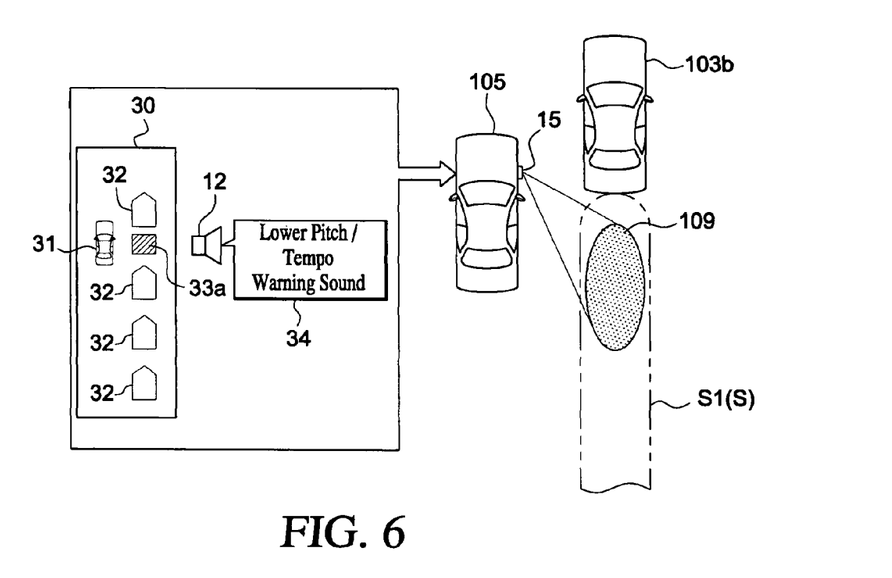
FIG. 6 is a diagram illustrating spacings available for merging (merging positions) and the guidance information by the navigation device.

When the recommended space S1 approaches close to the driver's vehicle 105, the control unit 2 changes the display on the first information display unit 30 as shown in FIGS. 6 and 7. More specifically, the space display symbol 33 to the side of the driver's vehicle display symbol 31 is caused to flash in order to indicate that the recommended space S1 has reached the right side of the driver's vehicle 105. At this time, the first information display unit 30 displays the symbols 33a and 33b with the same shape as the image mark formed on the road surface (the first entry point mark 109 or the second entry point mark 110).

During the above-described processing, the control unit 2 uses the speaker 12 to generate audible warnings 34, 35 as shown in FIGS. 6 and 7 so as to inform the driver that the recommended space S1 has reached the side of his vehicle 105. At this time, the generated audible warnings 34, 35 vary depending on the length of the recommended space S1. For example, if the recommended space S1 is not long enough to allow merging of the driver's vehicle 105, a high pitched or high tempo audible warning 35 is generated as shown in FIG. 7. Alternatively, if the recommended space S1 is long enough to allow merging of the driver's vehicle 105, the audible warning 34 is generated with a lower pitch or slower tempo than the audible warning 35.

Using the above-described apparatus, the driver adjusts the speed of the driver's vehicle 105 based on the visual images presented on the second information display unit 36 and the audible warnings 37a, 37b, and merges into the recommended space S1 based on the audible warnings 34, 35 and the visual guidance the first information display unit 30.

In addition, while the control unit 2 provides merger guidance, it determines whether merging has been completed based upon the driver's vehicle position, its orientation, and its speed (step S1-9). When the control unit 2 determines that the merging is completed (YES in step S1-9), the processing is ended. If it is determined that merging is not completed (NO in step S1-9), the routine returns to step S1-3 and detection of a recommended space S1 is started over again.

When audible guidance is output in step S1-5, for example, when the speaker 12 announces "Do you want to merge into the recommended space?" or the like, there will be occasions when the driver will not operate the switch 11 and when the driver cancels the merge guidance (NO in step S1-6). On such occasions, the control unit 2 uses the speaker 12 or the display 10 to provide voice guidance/display information such as, "Do you wish to merge into a different space?". Next, the control unit 2 waits to see if the driver provides an input, and then determines whether to search for another recommended space S1 (step S1-10). If the driver performs an input operation indicating that another recommended space S1 should be searched for (YES in step S1-10), the routine returns to step S1-3 and searches for another recommended space S1. If the driver does not provide any input, or if the driver cancels the search for another recommended space S1 (NO in step S1-10), the control unit 2 ends the processing.

Summarizing, the first embodiment, has the following features.

(1) According to the first embodiment, the navigation device 1 mounted in the driver's vehicle 105 uses the control unit 2 to (i) obtain data from the GPS receiver 3, the high accuracy map data storage unit 7, and the imaging device 9, and to (ii) accurately calculate the driver's vehicle position. In addition, the navigation device 1 receives the traffic information 20 including the position and the speed of the other vehicles 103 running along the main road 100 from the transmitter 17. The control unit 2 uses the traffic information 20 as a basis for detecting the positions, etc., of the inter-vehicle spaces S between those other vehicles 103. Then, the control unit 2 determines the recommended space S1 that is optimal for merging of the driver's vehicle 105, based on the position of the driver's vehicle position and the positions, etc., of the inter-vehicle spaces S. The navigation device 1 uses the beam radiating unit 15 provided in the driver's vehicle 105 to output a laser beam toward the recommended space S1, whereby the first or the second entry point mark 109, 110 are projected onto the road surface. With the above configuration, the presence of vehicles running in the lane 101 to be entered is detected and thus a suitable point for merging is identified by the navigation device 1, alleviating the driver of that burden. As a result, the navigation device 1 can give instructions to the driver for suitable merging points, including merging points that don't enter into the driver's field of vision. In addition, the point at which the driver is to merge can be made known to drivers of other vehicles 103 running along the main road 100. Accordingly, the drivers of the other vehicles 103 traveling the main road 100 become aware of the point at which the driver's vehicle 105 is going to merge, and thus the driver's vehicle 105 can smoothly merge into the main road 100.

(2) According to the first embodiment, the beam radiating unit 15 provided in the driver's vehicle 105 is operated to illuminate, as a moving space on the road surface, the inter-vehicle space S that the driver' is to merge into, i.e. a moving first or second entry point mark 109, 110 is displayed on the road surface. As a result, the drivers of the other vehicles 103 are able to accurately understand the inter-vehicle space S into which the driver's vehicle 105 is going to merge.

(3) According to the first embodiment, if the navigation device 1 determines that the recommended space S1 is sufficiently long to allow the driver's vehicle 105 to merge, the oval shaped first entry point mark 109, which is about the same size as the driver's vehicle 105, is formed on the road surface. Conversely, when it is determined that the recommended space S1 is not long enough to allow the driver's vehicle 105 to merge, the triangular shaped second entry point mark 110 is formed on the road surface. As a result, the drivers of the other vehicles 103 are informed as to whether the illuminated space is large enough to allow the driver's vehicle 105 to merge. Thus, the other vehicles 103 will slow down to allow the driver's vehicle 105 to merge smoothly. Moreover, the first entry point mark 109 is formed to be about the same size as the driver's vehicle 105. Accordingly, the drivers of the other vehicles 103 are able to understand, not only the position at which the driver's vehicle 105 to enter the road 101, but also the size of the driver's vehicle 105. As a result, the drivers of the other vehicles 103 become fully aware of the respective distances between their vehicles and the driver's vehicle 105, and thus accident prevention is promoted.

(4) According to the first embodiment, the navigation device 1 calculates the recommended speed and timing for merging into the recommended space S1, and outputs information based on these calculations using the speaker 12 and the first and second information display units 30, 36. As a result, the driver of vehicle 105 can be provided with instructions for the recommended speed and timing, to assist smooth merging onto the main road 101, whereby the driver's driving burden is reduced.

Second Embodiment

A second embodiment for carrying out the present invention will now be explained with reference to FIGS. 9 to 10. The second embodiment is the same as the first embodiment with the exception that the merging intention notification subroutine (step S1-7) is changed. Accordingly, the explanation of this second embodiment will focus on points of difference from the first embodiment. Other structural elements are denoted by the same reference numerals and a detailed explanation is omitted for the sake of simplicity of explanation.

Figure 9:
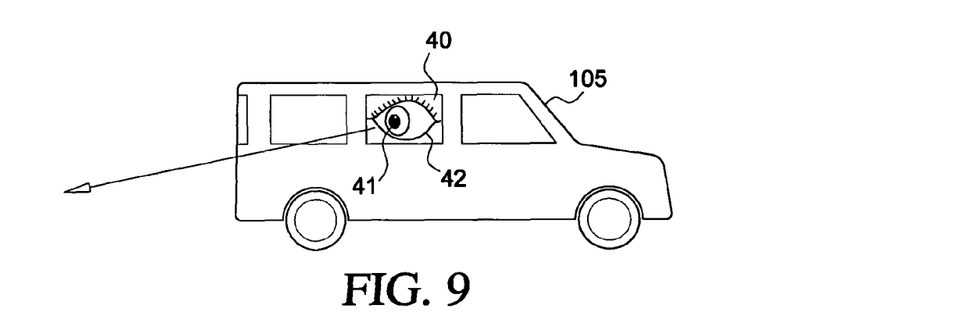
FIG. 9 is a diagram of a display unit of a second embodiment that indicates where the driver is to merge.
Figure 10:
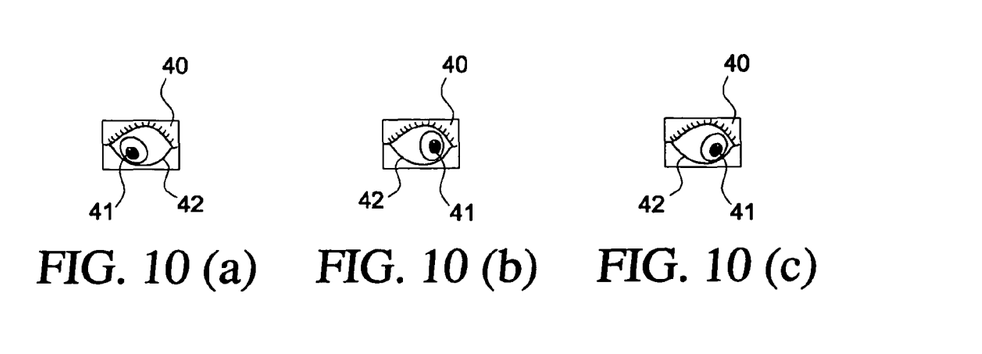
FIG. 10 is a diagram showing how the display unit indicates that a recommended space for merging is to the rear (FIG. 10A) or to the front (FIG. 10B, 10C).

Referring to FIG. 9, the driver's vehicle 105 is provided with display units 40 in the right and left windows (the latter is not shown). The display units 40 are, for example, liquid crystal displays. The display units 40 receive information for the relative distance and the relative position of the recommended space S1, transmitted from the control unit 2 of the navigation device 1. The display unit 40 then displays an image 42 of an eye that moves in accordance with the relative distance and relative position of the recommended space S1.

For example, if the recommended space S1 is to the right rear of the driver's vehicle 105, the image 42 is displayed with a pupil 41 positioned to the left side. Alternatively, if the recommended space S1 is close to and diagonally backward from the driver's vehicle 105, the image 42 is displayed with the pupil 41 positioned at the bottom-left side, as shown in FIG. 10A.

Further, if the position of the recommended space S1 is somewhat far to the front, the display unit 40 displays the image 42 with the pupil 41 at the right side, as shown by FIG. 10B. Alternatively, if the recommended space S1 is close to and diagonally forward of the driver's vehicle 105, the image 42 is displayed with the pupil 41 to the downward right side, as shown in FIG. 10C.

Thus, the drivers of the other vehicles 103 are visually notified where the vehicle 105 is going to merge from the image 42 displayed on the display units 40.

Thus, in addition to features (1)-(4) of the first embodiment, the second embodiment provides the following feature (5).

(5) According to the second embodiment, the display unit 40 provided in the driver's vehicle 105 is operated to display the eye image 42 that indicates the space into which the driver is to merge. As a result, the drivers of the other vehicle 103 can be accurately notified of the space into which the driver's vehicle 105 is going to merge.

The above-described embodiments may be modified in the following ways:

In the above embodiments, the first and the second information display units 30, 36 display the position and recommended speed for entry into the recommended space S1.

However, alternatively, this information may be displayed on the display 10 of the navigation device 1.

In the above embodiments, the recommended speed, the distance to be traveled to the recommended space S1, the timing for merging into the recommended space S1 may be communicated to the driver using voice guidance, instead of visual guidance.

In step S1-5 of the above embodiments, the speaker 12 generates a voice announcing, for example, "Do you want to merge into the recommended space?" However, an audible warning may be output instead.

In the first embodiment, the beam radiating unit 15 is used to form the oval shaped first entry point mark 109 or the triangular second entry point mark 110 on the road surface, in accordance with the signal from the navigation device 1. However, marks of other shapes may be formed. Further, the first and second entry point marks 109 and 110 may have the same shape.

In the first embodiment, the navigation device 1 may select the size of the first entry point mark 109 in accordance with the size of the driver's vehicle 105 in which the navigation device 1 is mounted.

In the second embodiment, the display unit 40 is a liquid crystal display or the like. However, an imaging device attached to the outside of the driver's vehicle 105 may be used to form images on the windshield.

Further, although in the second embodiment an eye image 42 is displayed, an arrow or a similar mark may be displayed instead.

In addition, although in the second embodiment the display units 40 are provided in the side windows, they may be provided in the rear window or the like.

Although in the above embodiments the traffic information 20 is received from the transmitter 17, vehicle-to-vehicle communication may be used instead. In this case, the driver's vehicle 105 is provided with a vehicle-to-vehicle communication system. Furthermore, if the other vehicles 103 running in the lane 101 to be entered are also provided with vehicle-to-vehicle communication systems, the present positions, speeds and acceleration/deceleration etc. of the other vehicles 103 may be received as vehicle-to-vehicle communication data. This vehicle-to-vehicle communication data corresponds to the traffic information 20 transmitted from the transmitter 17.

In the above embodiments, the traffic information may be obtained using the imaging device 9. More specifically, the imaging device 9 may detect the other vehicles 103 in the vicinity of the driver's vehicle 105, the distances to the other vehicles 103, and the speeds and acceleration/deceleration of the other vehicles 103 etc.

The explanation of the above embodiments focused on giving guidance when the driver's vehicle 105 merges into a high speed main road 100 from the merging road 102. However, the system can also provide guidance for the vehicle to merge into main roads 100 that are not high speed roads.

In the above embodiments, it is not necessary to provide the gyro 4 and the traffic information receiving unit 8 in the navigation device 1. Further, the control unit 2 may receive data from separately provided gyros 4 or traffic information receiving units 8. In addition, a data reading unit, not shown, may be provided in the navigation device 1, and this data reading unit used to read route data 6a, image data 6b, and high accuracy map data 7a stored on an optical disk.

The above embodiments describe an example in which the driving support device for providing support for a driver whose vehicle is merging into another lane is embodied as the navigation device 1. However, the driving support device may be embodied in devices having other structural configurations. For example, the present invention may be formed as a driving support device that does not include the display 10, the speakers 12, etc. and that only provides driving support.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support method for providing support for merging of a merging vehicle from one road onto another road as a main road, comprising:
   providing traffic information, including at least positions of other vehicles running on the main road, to a driving support device mounted in the merging vehicle;
   calculating positions of inter-vehicle spaces between the other vehicles, running on the main road, using the driving support device;
   determining which inter-vehicle space among the calculated inter-vehicle spaces is most suitable for the merging vehicle to merge into, using the driving support device; and
   notifying drivers of the other vehicles running on the main road of the determined inter-vehicle space by irradiating a beam which forms an image as a mark on a road surface in the determined inter-vehicle space, using an image forming unit provided in the merging vehicle.

2. The driving support method according to claim 1, wherein
   the image forming unit forms a first image mark on the road surface when it is determined that the length of the inter-vehicle space into which the merging vehicle is going to merge is sufficient to allow the merging vehicle to merge, and
   the image forming unit forms a second image mark, different from the first image mark, on the road surface when it is determined that the length of the inter-vehicle space into which the merging vehicle is going to merge is not sufficient to allow the merging vehicle to merge.

3. The driving support method according to claim 1, wherein the image formed on the road surface is a moving mark about the same size as the merging vehicle.

4. The driving support method according to claim 1, further comprising:
   determining whether a driver of the merging vehicle is going to merge into the determined inter-vehicle space based on driver input;
   only when it has been determined that the driver of the merging vehicle is going to merge into the determined inter-vehicle space, notifying drivers of the other vehicles running on the main road of the determined inter-vehicle space; and
   searching for another inter-vehicle space when it has been determined that the driver of the merging vehicle is not going to merge into the determined inter-vehicle space.

5. The driving support method according to claim 4 further comprising:
   communicating to the driver of the merging vehicle a question whether or not the driver is going to merge into the determined inter-vehicle space; and
   wherein the determining of whether the driver of the merging vehicle is going to merge into the determined inter-vehicle space is based on input from the driver in answer to the question.

6. A driving support device for providing support for merging of a merging vehicle from one road onto another road as a main road, the driving support device comprising:
- a merging vehicle information obtaining unit that obtains information about the merging vehicle including at least current position and speed of the merging vehicle;
- a traffic information obtaining unit that obtains traffic information including at least positions of other vehicles running on the main road;
- a calculation unit that calculates at least respective positions and lengths of inter-vehicle spaces between the other vehicles, running on the main road, based on the traffic information;
- a space determining unit that determines which inter-vehicle space, among the calculated inter-vehicle spaces, is most suitable for the merging vehicle to merge into, based on the driver's vehicle information and the calculated length and position of each inter-vehicle space;
- an image forming unit, provided in the merging vehicle, which projects a beam of radiation onto a road surface to form an image as a mark on the road surface; and
- an imaging control unit that notifies drivers of the other vehicles of the determined inter-vehicle space by using the image forming unit to project the beam of radiation onto the road surface within the determined inter-vehicle space.

7. The driving support device according to claim 6, wherein
the image forming unit forms a first image mark on the road surface when it is determined that the length of the inter-vehicle space into which the merging vehicle is going to merge is sufficient to allow the merging vehicle to merge, and
the image forming unit forms a second image mark, different from the first image mark, on the road surface when it is determined that the length of the inter-vehicle space into which the merging vehicle is going to merge is not sufficient to allow the merging vehicle to merge.

8. The driving support device according to claim 7, further comprising:
- a computation unit that calculates at least one of recommended speed and timing for merging, based on the position and speed of movement of the inter-vehicle space into which the merging vehicle is going to merge, and on the position and the speed of the merging vehicle; and
- an output control unit that outputs at least one of the recommended speed and the timing using at least one of a speaker and a display.

9. The driving support device according to claim 7, further comprising:
- a computation unit that calculates at least one of recommended speed and timing for merging, based on the position and speed of movement of the inter-vehicle space into which the merging vehicle is going to merge, and on the position and the speed of the merging vehicle; and
- an output control unit that outputs at least one of the recommended speed and the timing using at least one of a speaker and a display.

10. The driving support device according to claim 8, wherein
the output control unit displays the position of the inter-vehicle space into which the merging vehicle is going to merge.

11. The driving support device according to claim 9, wherein
the output control unit displays the position of the inter-vehicle space into which the merging vehicle is going to merge.

12. The driving support device according to claim 6, further comprising:
- a computation unit that calculates at least one of recommended speed and timing for merging, based on the position and speed of movement of the inter-vehicle space into which the merging vehicle is going to merge, and on the position and the speed of the merging vehicle; and
- an output control unit that outputs at least one of the recommended speed and the timing using at least one of a speaker and a display.

13. The driving support device according to claim 12, wherein
the output control unit displays the position of the inter-vehicle space into which the merging vehicle is going to merge.

14. The driving support device according to claim 6, wherein the image formed on the road surface is a moving mark about the same size as the merging vehicle.

15. The driving support device according to claim 6 further comprising:
- a merging determination unit for determining whether or not a driver of the merging vehicle is going to merge into the determined inter-vehicle space based on driver input; and
- wherein the imaging control unit, when it has been determined that the driver of the merging vehicle is going to merge into the determined inter-vehicle space, notifies drivers of the other vehicles of the determined inter-vehicle space by using the image forming unit and, when it has been determined that the driver of the merging vehicle is not going to merge into the determined inter-vehicle space, the device searches for another suitable inter-vehicle space.

16. The driving support device according to claim 15 further comprising:
wherein the merging determination unit determines whether the driver of the merging vehicle is going to merge into the determined inter-vehicle space based on input from the driver in answer to a question communicated to the driver.

* * * * *